United States Patent [19]

Morera et al.

[11] Patent Number: 5,311,554
[45] Date of Patent: May 10, 1994

[54] SYNCHRONIZED OFFSET EXTRACTION IN A DATA RECEIVER

[75] Inventors: Daniel A. Morera, Boynton Beach; David R. Petreye, Lake Worth, both of Fla.

[73] Assignee: Motorola, Inc., Schaumburg, Ill.

[21] Appl. No.: 907,965

[22] Filed: Jul. 2, 1992

[51] Int. Cl.⁵ .................. H03K 9/00; H04L 27/06; H04L 25.06
[52] U.S. Cl. .................. 375/75; 375/76; 340/825.44
[58] Field of Search ............ 375/76, 75; 340/825.44; 307/351, 358, 540, 296.1, 106, 359; 328/146, 162; 455/343, 38.1, 38.2, 38.3

[56] References Cited

U.S. PATENT DOCUMENTS

| | | | |
|---|---|---|---|
| 4,481,675 | 11/1984 | Ichikawa et al. | 455/38.3 X |
| 4,625,320 | 11/1986 | Butcher | 375/76 |
| 4,631,737 | 12/1986 | Davis et al. | 375/76 |
| 4,821,292 | 4/1989 | Childress | 375/76 |
| 5,025,251 | 6/1991 | Mittel et al. | 340/825.44 |
| 5,051,993 | 9/1991 | DeLuca et al. | 340/825.44 |
| 5,058,204 | 10/1991 | Tahernia et al. | 455/183.1 |

Primary Examiner—Stephen Chin
Assistant Examiner—Tesfaldet Bocure
Attorney, Agent, or Firm—Michael J. DeLuca; Daniel R. Collopy; Thomas G. Berry

[57] ABSTRACT

A selective call receiver (106) receives a radio frequency signal having digital signals contained within symbols. The signal demodulated by the receiver (804) comprises a substantially constant DC offset voltage and an AC voltage (1810) indicative of the information contained within the symbols. A threshold level extraction circuit (808) which extracts the offset voltage is synchronously controlled (1840) providing for sampling of the received signal by the threshold level extraction circuit in substantially the center of each symbol.

17 Claims, 9 Drawing Sheets

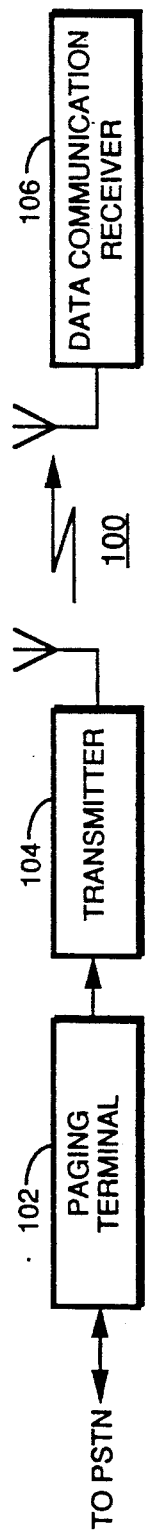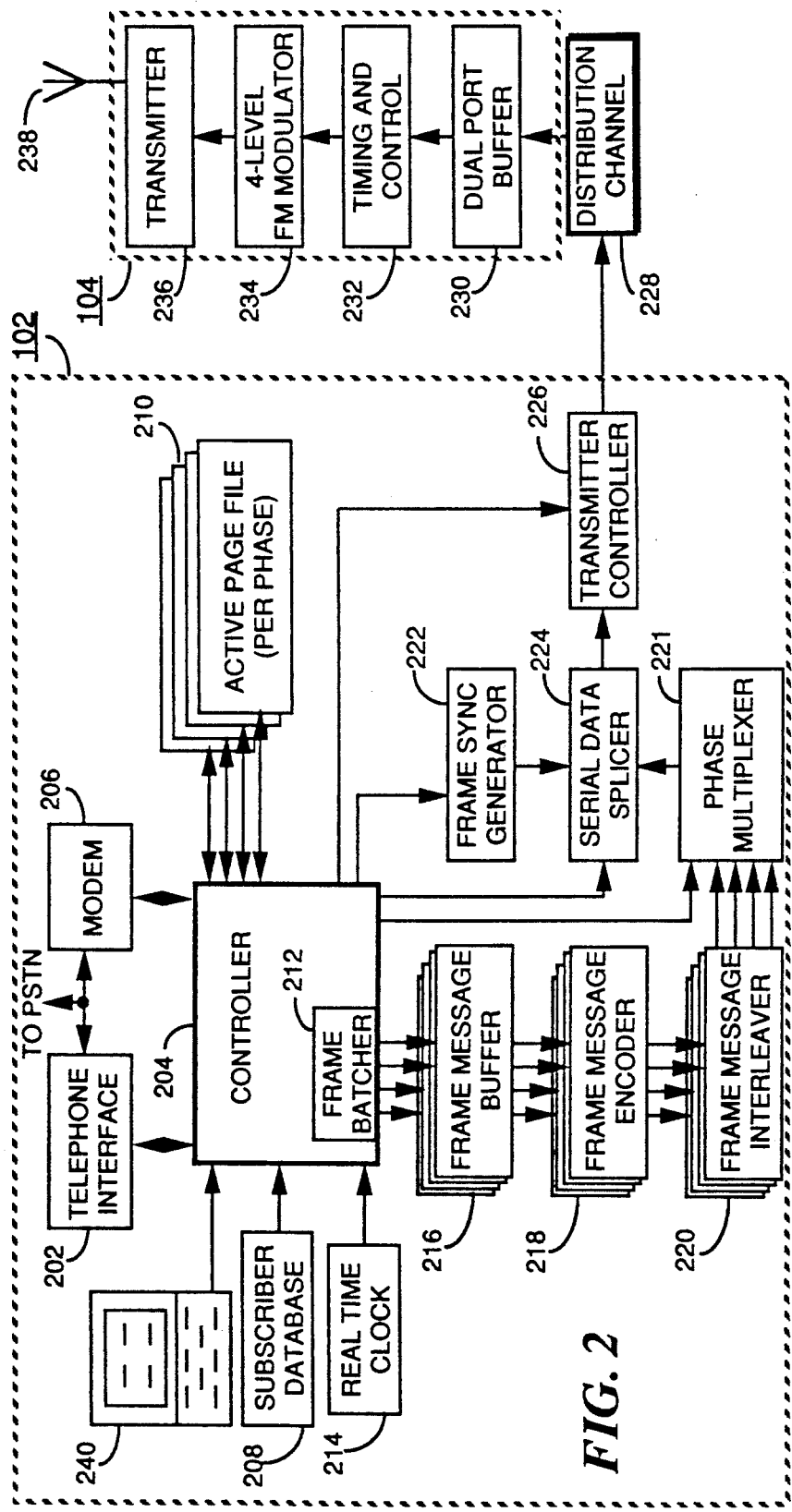
FIG. 1
FIG. 2

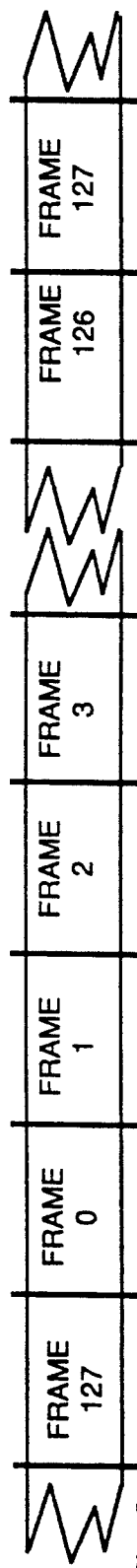
*FIG. 3*
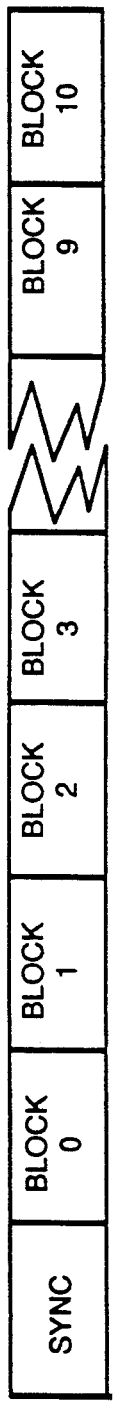
*FIG. 4*
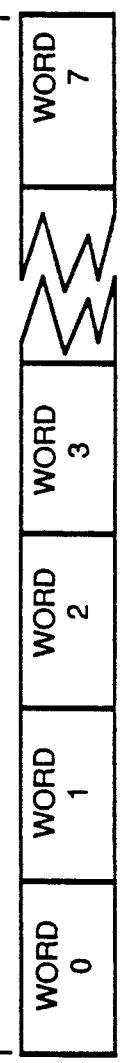
*FIG. 5*
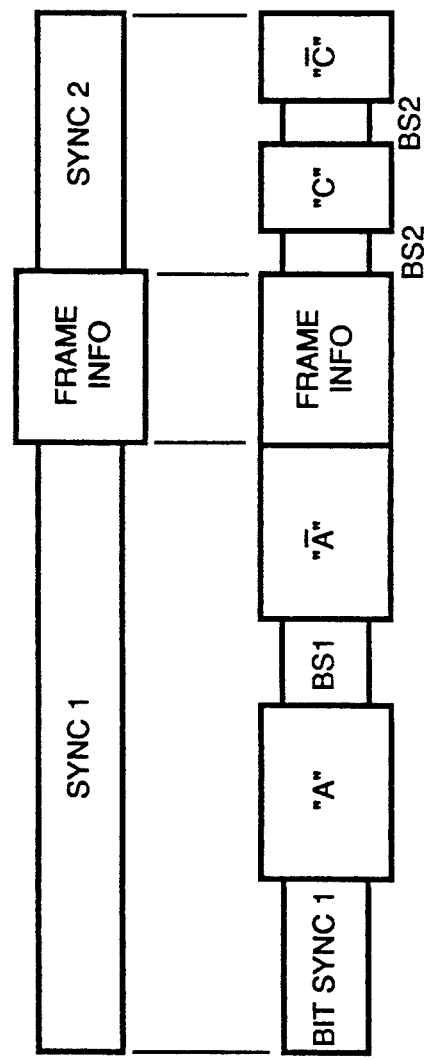
*FIG. 6*
*FIG. 7*

SYNCHRONIZED OFFSET EXTRACTION IN A DATA RECEIVER

FIELD OF THE INVENTION

This invention relates generally to the area of recovery of digital data from a radio signal. In particular, this invention relates to the synchronous control of receiver circuitry used to acquire a frequency offset voltage in order to extract data contained within symbols modulated thereon.

BACKGROUND OF THE INVENTION

Radio frequency signals received by portable receivers such as pagers, are mixed down to an intermediate frequency and demodulated. The demodulated signal comprises a substantially constant offset voltage with information modulated thereon. The offset voltage is a function of the radio frequency carrier offset, the frequency tolerance of the receiver's local oscillator, and individual characteristics of the demodulator circuit. These characteristics vary from one receiver to another, as well as with the ambient temperature and battery voltage. Thus the offset voltage varies over time and must be determined periodically in order to extract the information modulated thereon. The information is extracted and digitized by comparing the offset voltage to the output of the demodulator.

Extracting the offset voltage (otherwise referred to as a threshold voltage) has been a subject of numerous inventions. However, as digital signalling protocols for portable devices such as pagers move into both higher symbol rates and multi-level symbol signalling systems, the problems in this area are compounded. In simulcast environments (as well as Gausian environments), the rapidly changing signals may combine with noise in the receiver's IF to produce noise spikes during the transitions between symbols. These noise spikes interfere with the acquisition of the offset voltage. Thus it is desirable to determine the location of the noise spikes and block their interference with the acquisition of the offset voltage.

SUMMARY OF THE INVENTION

It is an object of this invention to provide a method and apparatus which extracts a received offset signal during intervals synchronized with received symbols.

It is a further object of this invention to provide a method of digitizing a received signal having a substantially constant offset signal and a symbol stream having a predetermined baud rate modulated thereon, said method comprising the steps of enabling determination of the offset signal for a portion of each symbol in synchronization with the symbol stream, and disabling determination of the offset signal for a portion of the symbol exclusive of said step of enabling.

It is a further object of this invention to provide an apparatus for digitizing a received signal having a substantially constant offset signal and a symbol stream having a predetermined baud rate modulated thereon, said apparatus comprising a determining means for determining the magnitude of the offset signal, and a control means for enabling said determining means for a portion of each symbol in synchronization with the symbol stream.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 3-5 are timing diagrams illustrating the transmission format of the signaling protocol utilized in accordance with the preferred embodiment of the present invention.

FIGS. 6 and 7 are timing diagrams illustrating the synchronization signals utilized in accordance with the preferred embodiment of the present invention.

DESCRIPTION OF THE EMBODIMENTS

Figure 8:
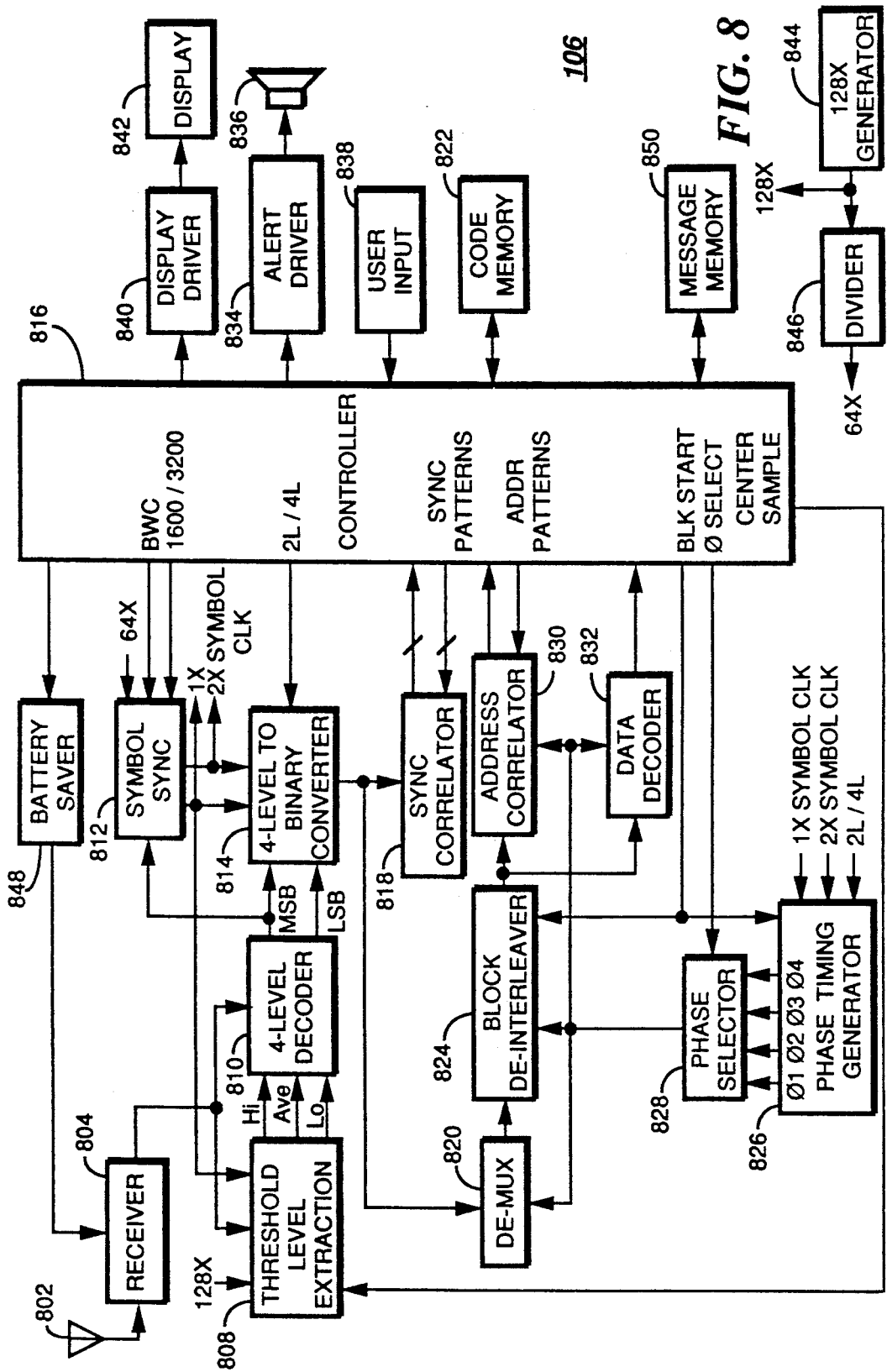
FIG. 8 is an electrical block diagram of a data communication receiver in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone are coupled to the paging terminal 102 through a telephone interface 202 in a manner well known in the art. Longer messages, such as alphanumeric messages which require the use of a data entry device are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5 each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames.

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
|---|---|
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter call the controller 816, receives and processes inputs from a number of peripheral circuits, as shown in FIG. 8, and controls the operation and interaction of the peripheral circuits using software subroutines. The use of a microcomputer controller for processing and control functions is well known to one of ordinary skill in the art.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810.

Figure 9:
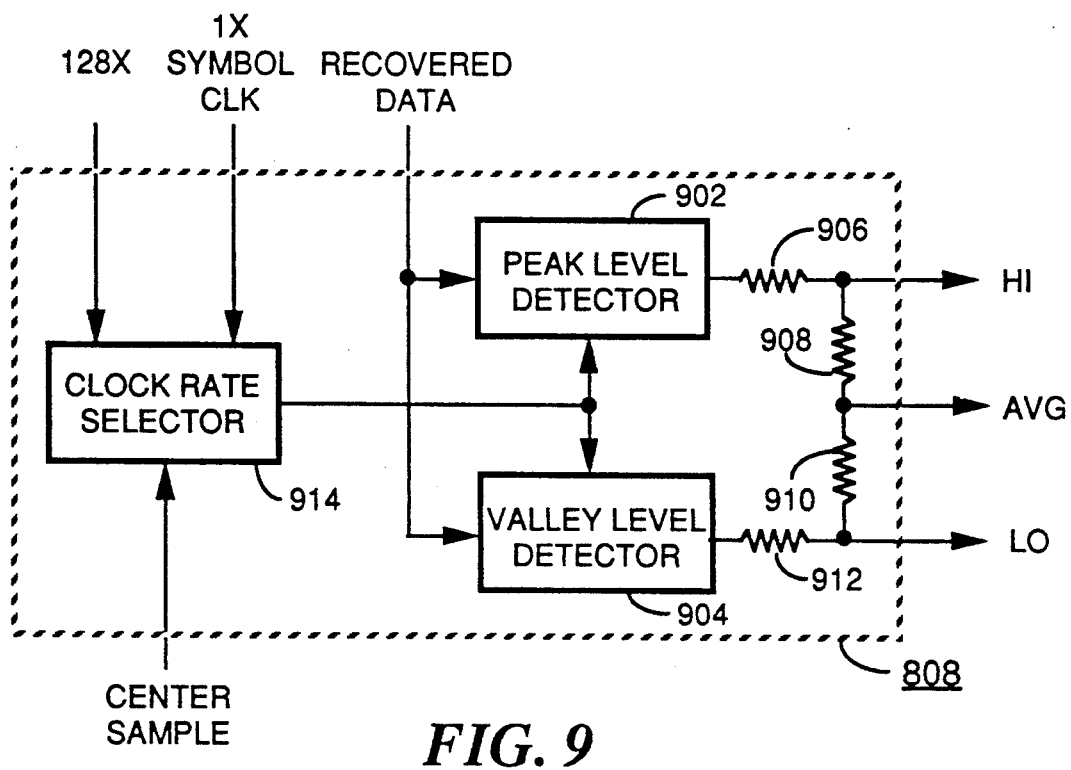
FIG. 9 is an electrical block diagram of a threshold level extraction circuit utilized in the data communication receiver of FIG. 8.

The threshold level extraction circuit 808 is best understood by referring to FIG. 9, and as shown comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The construction and operation of the level detectors 902 and 904 are known to those familiar with the art and will be briefly described. In response to the clock signal from selector 914, the peak detector 902 periodically samples the received signal (recovered data) to generate sampled magnitude and compares the sampled magnitude to a digitally stored maximum magnitude. If the sampled magnitude is greater than the maximum magnitude, the maximum magnitude is equated to the sampled magnitude and stored. Similarly, in response to the clock signal from selector 914, the valley detector 904 periodically samples the received signal (recovered data) to generate sampled magnitude and compares the sampled magnitude to a digitally stored minimum magnitude. If the sampled magnitude is less than the minimum magnitude, the minimum magnitude is equated to the sampled magnitude and stored.

The signal outputs of detectors 902, 904 are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128× clock, i.e. a clock having a frequency equivalent to 128 times the slowest data bit rate, which as described above is 1600 bps. The 128× clock is generated by 128× clock generator 844, as shown in FIG. 8, which is preferably a crystal controlled oscillator operating at 204.8 KHz (kilohertz). The output of the 128× clock generator 844 couples to an input of frequency divider 846 which divides the output frequency by two to generate a 64× clock at 102.4 KHz. Returning to FIG. 9, the 128× clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1× symbol clock which is generated by symbol synchronizer 812 as shown in FIG. 8.

Figure 16:
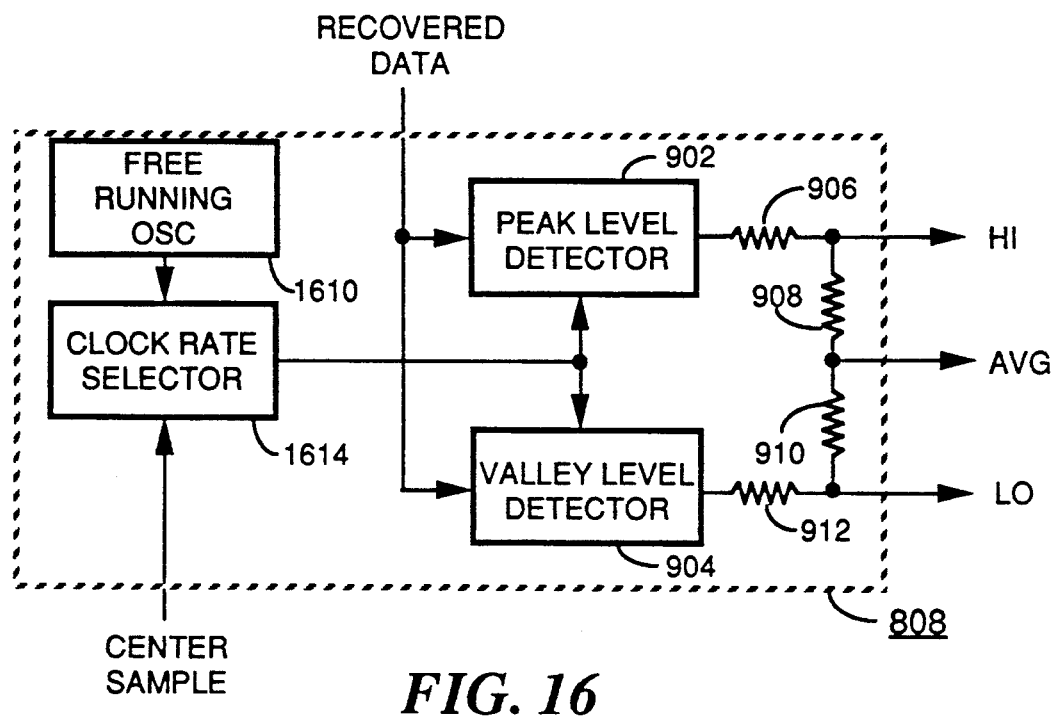
FIG. 16 shows another embodiment of the threshold level extraction circuit.

FIG. 16 shows another embodiment of threshold level extraction circuit 808. In this embodiment, the 128× and 1× symbol clocks are replaced with a free running oscillator 1610. Preferably, free running oscillator has a clock speed which allows both peak and valley detectors 902 and 904 to acquire the respective peak and valley of the data in one or two symbols, the free running clock 1610 could be the aforementioned 128× clock. The center sample is operated such that the oscillator 1610 is continuously gated to the peak and valley detectors enabling them to determine the threshold level for each entire symbol during initial synchronization acquisition. Thereafter the free running oscillator is gated by clock selector 1614 such that the data may only be sampled substantially in the center of each symbol.

Figure 17:
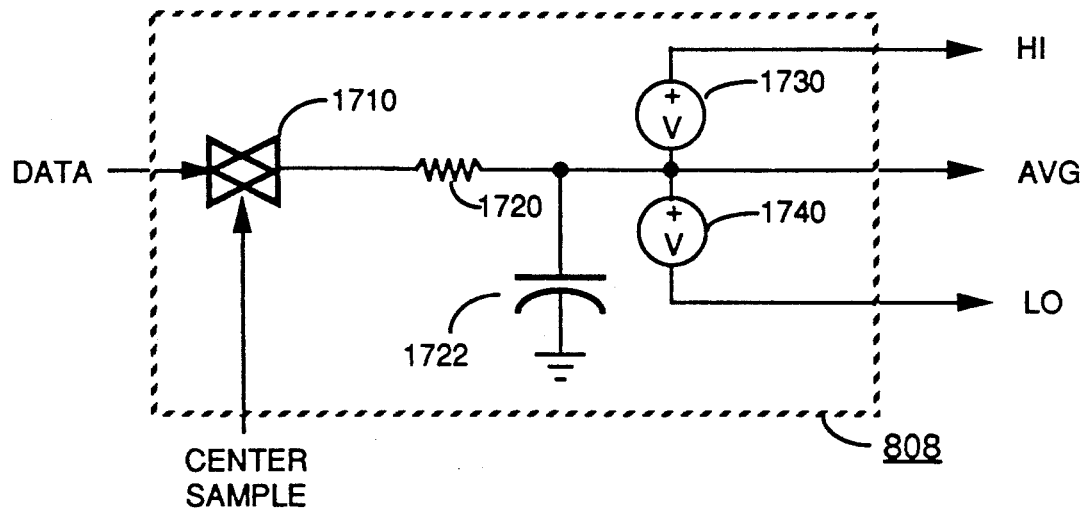
FIG. 17 shows an alternate embodiment of the threshold level extraction circuit.

FIG. 17 shows an alternate embodiment of the threshold level extraction circuit 808. When transmission gate 1710 opens over a long period of time, resistor 1720 and capacitor 1722 operate to average the symbol level because the RC time constant is substantially longer in time than a symbol. The average voltage on capacitor 1722 is equivalent to the (Avg) threshold. While this method is well suited for binary data, it may also be adapted to multi-level modulation. FIG. 17 also shows an alternate method of generating the (Hi) and (Lo) thresholds from the average (Avg). This method of generating (Hi) and (Lo) thresholds may alternately be incorporated into the threshold extraction circuits of FIG. 9 or FIG. 16. By adding or subtracting predetermined voltages 1730 and 1740 from the average, (Hi) and (Lo) thresholds may be reproduced. By this method, symmetrical corruption of the peak and valley levels does not corrupt the (Hi) and (Lo) thresholds.

Figure 18:
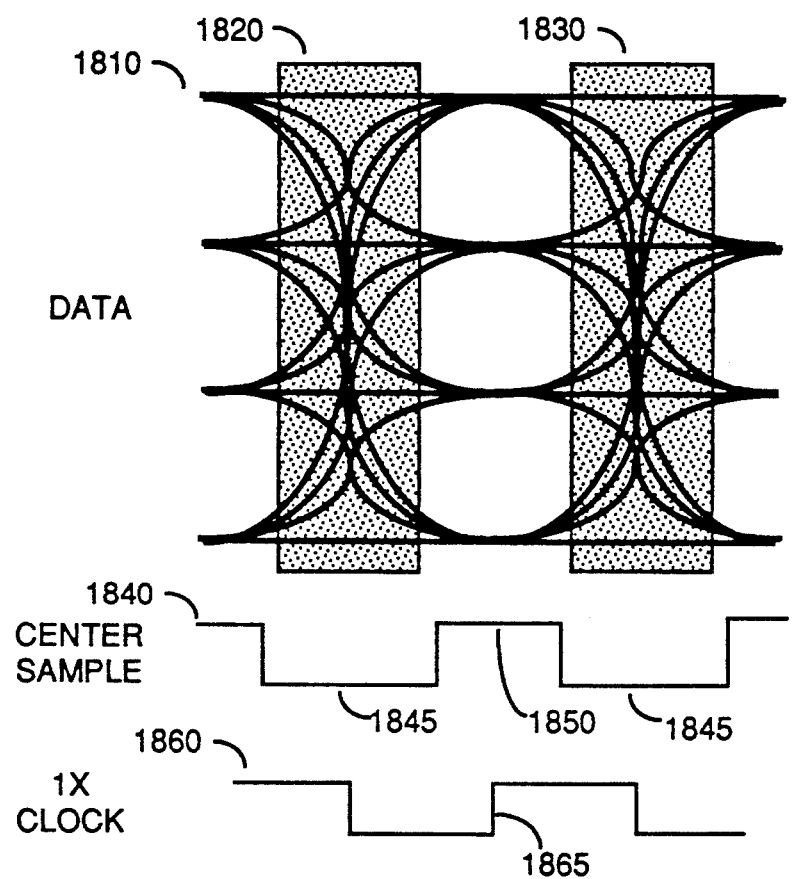
FIG. 18 shows the timing of the synchronized operation of the threshold level extraction circuit.

FIG. 18 shows the timing of the synchronized operation of threshold level extraction circuit 808. Eye pattern 1810 is an idealize representation of a four level symbol. It consists of a substantially constant DC offset voltage (not shown) and symbol stream having a predetermined baud rate. Shaded areas 1820 and 1830 represent the transition regions between the symbols. Note that in the non-shaded areas, the levels within the symbol are relatively clearly defined and represent the center of the symbol. Spikes may exceed the minimum and maximum levels shown in shaded area the transition area. This is particularly true in simulcast situations where the symbol transitions from one transmitter is received later that the symbol transitions from another transmitter. Also, during the transition interval, noise may combine with the transitions of the signal in the IF to produce spikes exceeding the minimum or maximum levels of the eye pattern. Thus, by disabling the threshold level acquisition during the transition intervals (where erroneous thresholds are more likely to occur) and enabling them only during the substantial center of each symbol(where erroneous thresholds are less likely to occur), threshold level extraction is improved.

Line 1840 shows the center sample signal of FIGS. 9, 16, and 17, after synchronization has occurred. During low intervals 1845, sampling of the data is disabled. During high intervals 1850, sampling is enabled. After synchronization is acquired by symbol sync 812, the 1× symbol clock 1860, generated by symbol sync 812, has a transition 1865 synchronized substantially to the center of each symbol. Interval 1850 is preferably symmetrical with respect to transition 1865 of the 1× symbol clock. The duration may be varied in certain applications, and is preferably 25% of a symbol. In FIG. 9, one sample is enabled in the center of the symbol. In FIG. 16, multiple cycles clock peak and valley detectors 902 and 904 during substantially the center of the symbol. In FIG. 17, the averaging of R 1720 and C 1722 only occurs in the substantial center of the symbol.

Figure 10:
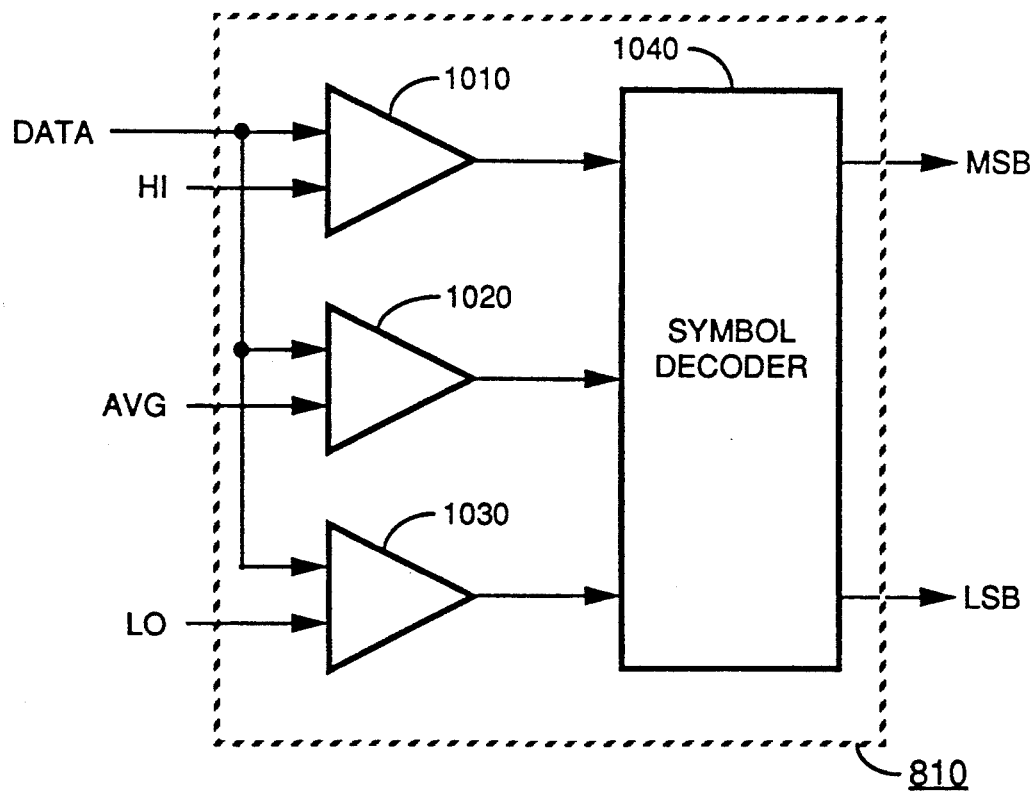
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
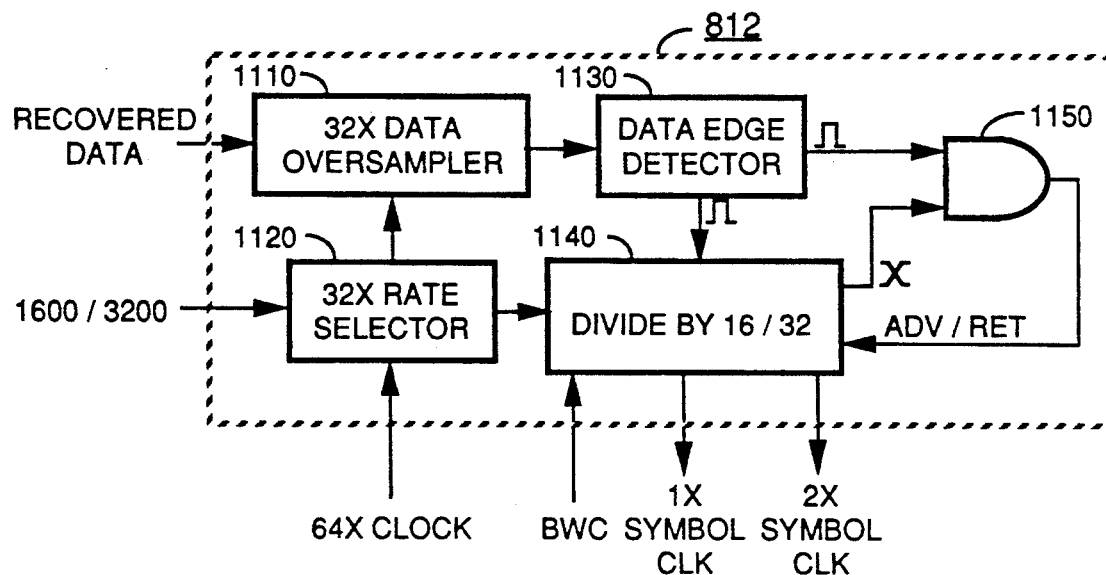
FIG. 11 is an electrical block diagram of a symbol synchronizer utilized in the data communication receiver of FIG. 8.

The operation of the symbol synchronizer 812 is best understood by referring to FIG. 11. The 64× clock at 102.4 KHz which is generated by frequency divider 846, is coupled to an input of a 32× rate selector 1120. The 32× rate selector 1120 is preferably a divider which provides selective division by 1 or 2 to generate a sample clock which is thirty-two times the symbol transmission rate. A control signal (1600/3200) is coupled to a second input of the 32× rate selector 1120, and is used to select the sample clock rate for symbol transmission rates of 1600 and 3200 symbols per second. The selected sample clock is coupled to an input of 32× data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1× and 2× symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1× and 2× symbol clocks with the recovered data signal. The symbol clock rates generated are best understood from the table below.

| Input Clock (Relative) | Control Input (SPS) | Rate Selector Divide Ratio | Rate Selector Output | 2X Symbol Clock (BPS) | 1X Symbol Clock (BPS) |
|---|---|---|---|---|---|
| 64X | 1600 | by 2 | 32X | 3200 | 1600 |
| 64X | 3200 | by 1 | 64X | 6400 | 3200 |

As shown in the table above, the 1× and 2× symbol clocks are generated 1600, 3200 and 6400 bits per second and are synchronized with the recovered data signal.

Figure 12:
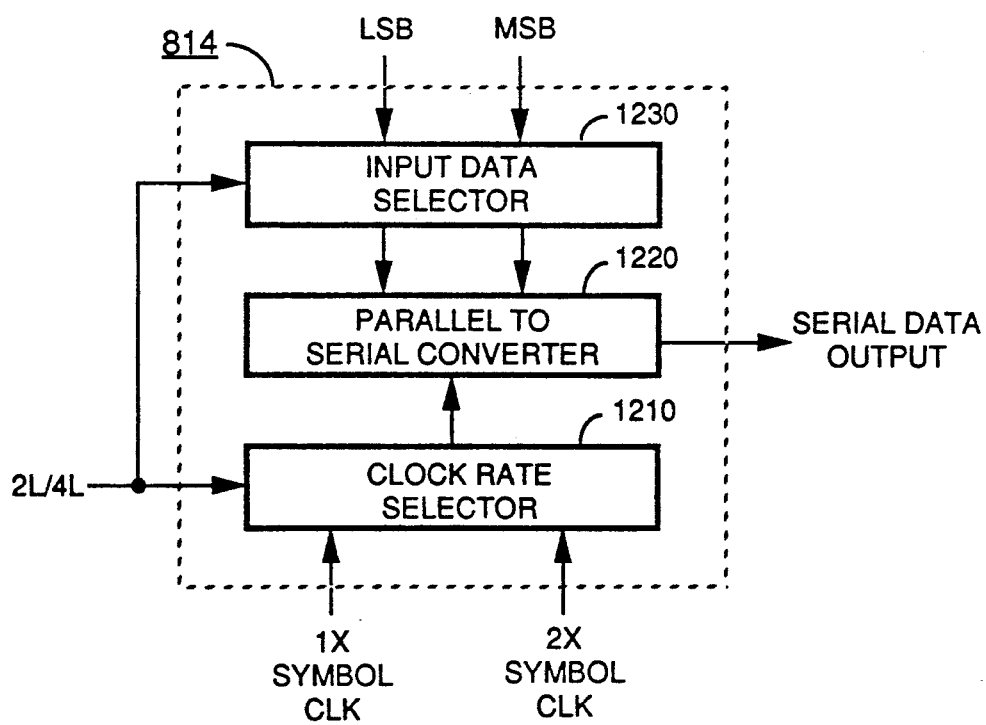
FIG. 12 is an electrical block diagram of a 4-level to binary converter utilized in the data communication receiver of FIG. 8.

The 4-level binary converter 814 is best understood by referring to FIG. 12. The 1× symbol clock is coupled to a first clock input of a clock rate selector 1210. A 2× symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1× clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2× clock input is selected by clock rate selector 1210 which results in a serial two bit binary data stream to be generated at 2× the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
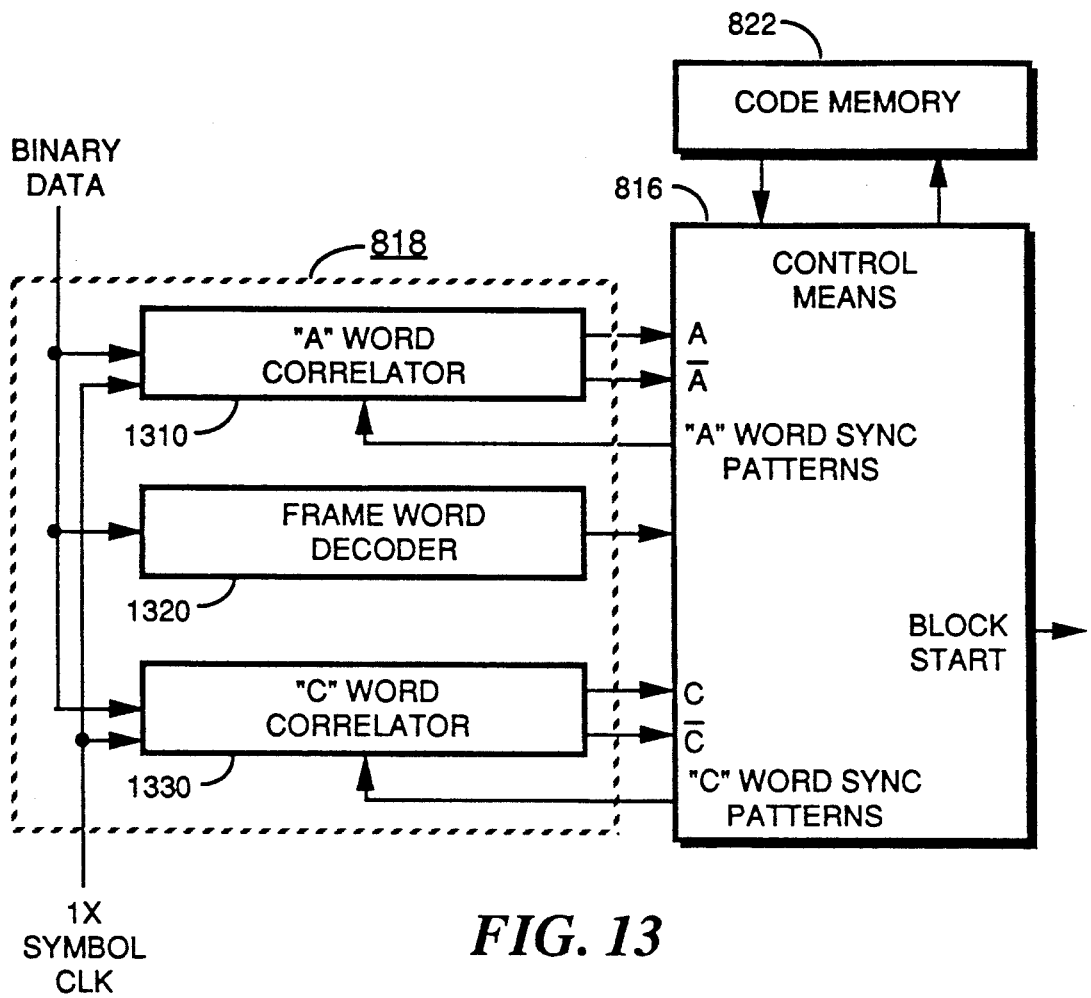
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
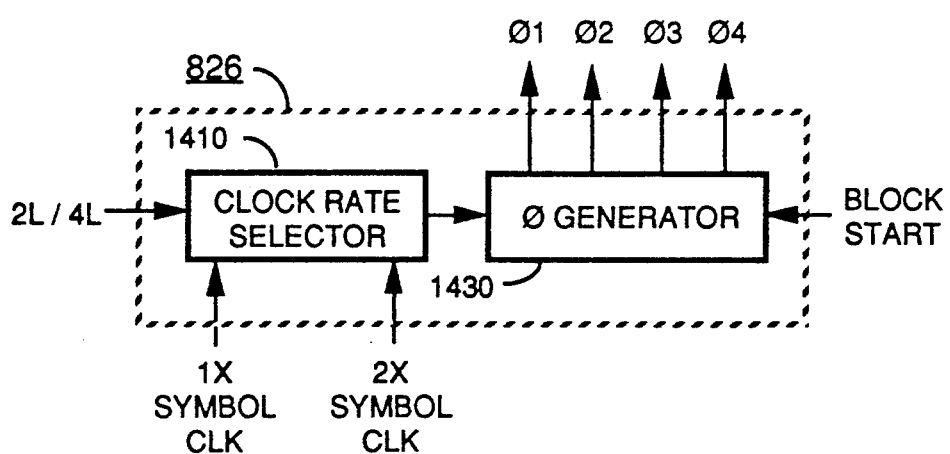
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L/4L) is coupled to an input of clock rate selector 1410 which selects either 1× or 2× symbol clock inputs. The selected symbol clock is coupled to the input of a phase generator 1430 which is preferably a clocked ring counter which is clocked to generate four phase output signals ($\phi1-\phi4$). A block start signal is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822, the transmission phase number to which the data communication receiver is assigned. The phase number is transferred to the phase select output ($\phi$ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver, and couples the patterns to a second input of the address correlator. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 15:
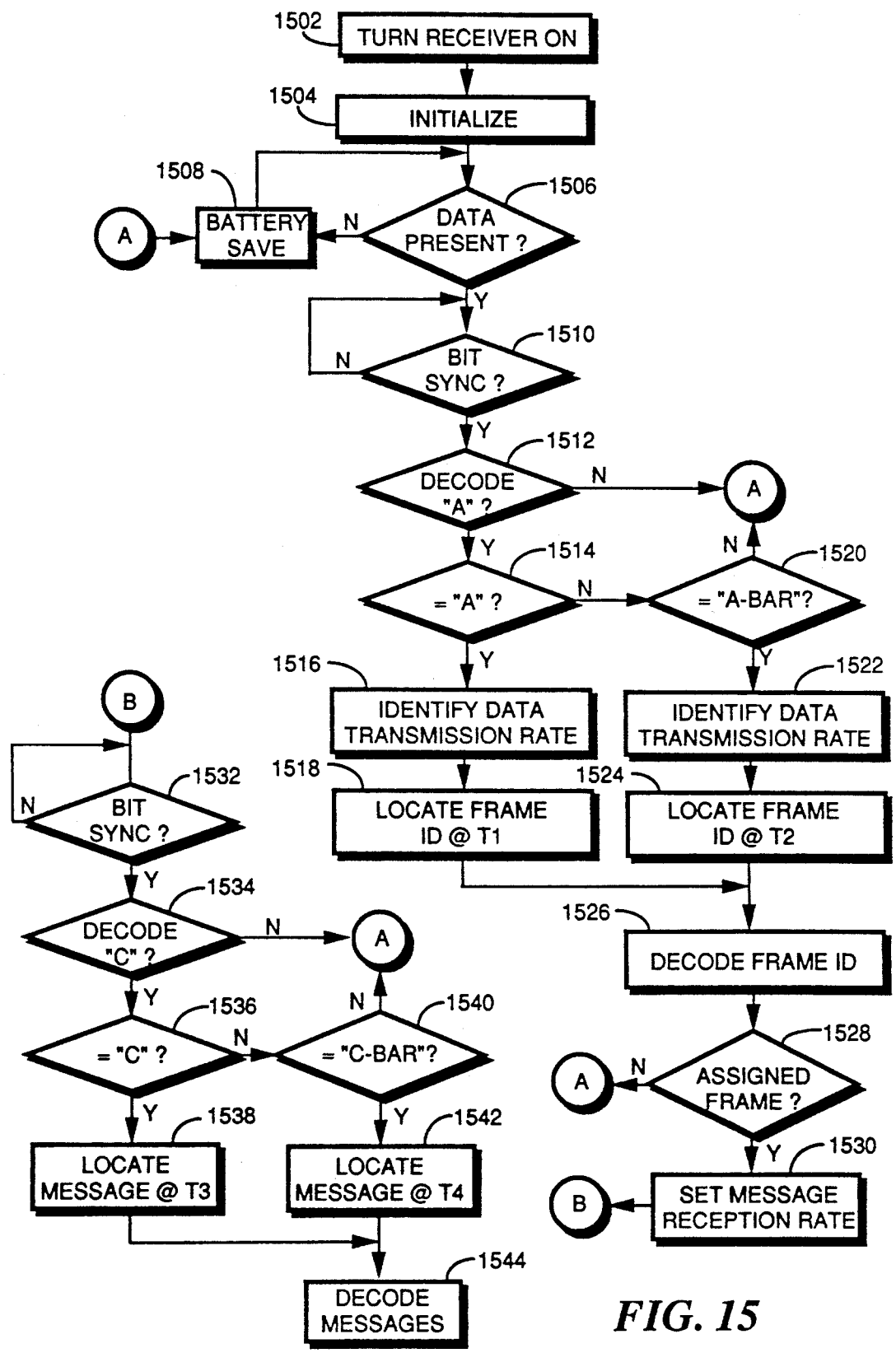
FIG. 15 is a flow chart illustrating the synchronization correlation sequence in accordance with the preferred embodiment of the present invention.

FIG. 15 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A" bar is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar"

word is detected, at step 1540, frame synchronization is obtained, and the time (T4) to the start of the message information is identified, at step 1542. At the appropriate time, message decoding can begin at step 1544.

We claim:

1. A selective call receiver comprising:
   receiving means for receiving and demodulating a radio frequency signal having digital information contained within symbols modulated thereon and for producing a received signal having a substantially constant DC offset voltage with an AC voltage representing the symbols combined therewith;
   determining means for determining the DC offset voltage;
   digitizing means for comparing the determined DC offset voltage with the received signal and for producing a digital signal indicative of the information contained within the symbols;
   synchronizing means for synchronizing to the symbols and for producing a synchronization signal in response thereto;
   decoding means for decoding the digital signal in response to the synchronization signal and for storing and alerting the reception of information directed to the selective call receiver; and
   control means responsive to the synchronization signal for enabling said determining means substantially in the center of each symbol.

2. The selective call receiver of claim 1 wherein:
   said synchronizing means operates in a sync acquisition mode when initially determining the substantial center of each symbol, and operates in a sync maintenance mode thereafter; and further wherein:
   said control means enables said determining means for each entire symbol while said synchronizing means operates in the sync acquisition mode, and enables said determining means substantially in the center of each symbol while said synchronizing means operates in the sync maintenance mode.

3. A method of digitizing a received signal having a substantially constant offset signal and a symbol stream having a predetermined baud rate modulated thereon, said method comprising the steps of:
   enabling determination of the offset signal for a portion of each symbol in synchronization with the symbol stream; and
   disabling determination of the offset signal for a portion of each symbol exclusive of said step of enabling wherein said step of enabling occurs substantially during the center of each symbol, and wherein said step of disabling occurs substantially during transitions between symbols.

4. The method according to claim 3 further comprising the steps of:
   acquiring synchronization to the symbol stream; and
   enabling determination of the offset signal for each entire symbol during said sep of acquiring.

5. The method according to claim 3 further comprising the step of decoding the symbol stream and generating an alert in response to the symbol stream having an address matching a predetermined address.

6. The method according to claim 3 further comprising the steps of:
   determining an average magnitude of the offset signal;
   comparing the received signal to the determined average magnitude of the offset signal;
   generating a first digital state if the received signal is greater than the determined average magnitude of the offset signal;
   generating a second digital state if the received signal is less than the determined average magnitude of the offset signal; and
   processing the first and second digital states in order to recover digital information contained within the received signal.

7. The method according to claim 6 wherein said step of determining the average magnitude of the offset signal during said step of enabling includes the steps of:
   periodically sampling the received signal to generate a sampled magnitude;
   comparing the sampled magnitude to a maximum magnitude;
   equating the maximum magnitude to the sampled magnitude if the sampled magnitude is greater than the maximum magnitude;
   comparing the sampled magnitude to a minimum magnitude;
   equating the minimum magnitude to the sampled magnitude if the sampled magnitude is less than the minimum magnitude; and said step of disabling further includes the step of:
   maintaining the equated minimum and maximum magnitudes; and both said steps of enabling and disabling further include the step of:
   averaging the minimum and maximum magnitudes to generate the determined average magnitude of the offset signal.

8. The method according to claim 3 further comprising the steps of:
   determining a magnitude of the offset signal;
   comparing the received signal to the determined magnitude of the offset signal;
   generating a first digital state if the received signal is greater than the determined magnitude of the offset signal and less than the determined magnitude plus a first value; and
   generating a second digital state if the received signal is less than the determined magnitude of the offset signal and greater than the determined magnitude minus a second value;
   generating a third digital state if the received signal is greater than the determined magnitude of the offset signal plus the first value;
   generating a fourth digital state if the received signal is less than the determined magnitude of the offset signal minus the second value; and
   processing the first, second, third and fourth digital states in order to recover digital information contained within the received signal.

9. The method according to claim 8 wherein the first and second values are predetermined.

10. The method according to claim 8 wherein said step of determining the magnitude of the offset signal during said step of enabling includes the steps of:
    periodically sampling the received signal to generate a sampled magnitude;
    comparing the sampled magnitude to a maximum magnitude,
    equating the maximum magnitude to the sampled magnitude if the sampled magnitude is greater than the maximum magnitude;
    comparing the sampled magnitude to a minimum magnitude;

equating the minimum magnitude to the sampled magnitude if the sampled magnitude is less than the minimum magnitude; and said step of disabling further includes the step of:

maintaining the equated minimum and maximum magnitudes; and said steps of disabling and enabling further includes the steps of:

averaging the minimum and maximum magnitudes to generate the determined magnitude of the offset signal; and further wherein:

said first value is determined by averaging the determined magnitude of the offset signal and the maximum magnitude; and said second value is determined by averaging the determined magnitude of the offset signal and the minimum magnitude.

11. An apparatus for digitizing a received signal having a substantially constant offset signal and a symbol stream having a predetermined baud rate modulated thereon, said apparatus comprising:

determining means for determining the magnitude of the offset signal; and control means for enabling said determining means for a portion of each symbol in synchronization with the symbol stream wherein said control means enables said determining means substantially during the center of each symbol, and disables said determining means substantially during transitions between symbols.

12. The apparatus according to claim 11 further comprising:

synchronizing means for determining the occurrence of the substantial center of each symbol and the transitions between symbols, and further wherein:

said control means enables said determining means for each entire symbol while said synchronizing means is acquiring synchronization to the symbols.

13. The apparatus according to claim 11 wherein said determining means further includes:

averaging means for determining the average magnitude of the received signal; and said apparatus further includes:

comparison means for comparing the received signal with the average magnitude to produce a digital signal substantially equivalent to information contained within the symbol stream.

14. The apparatus of claim 13 wherein said averaging means further includes:

peak detecting means for determining the maximum magnitude of the received signal in response to a clock signal;

valley detecting means for determining a minimum magnitude in response to the clock signal; and summing means for averaging the maximum and minimum signals to produce the average magnitude; and wherein said control means generates an at least one clock cycle substantially in the center of each symbol.

15. The apparatus of claim 14 wherein said control means generates a multiplicity of clock cycles substantially symmetrical with respect to the substantial center of each symbol.

16. The apparatus of claim 13 wherein the offset signal is represented by a substantially constant DC voltage, and the symbol stream is represented by an AC component added to the DC voltage, and wherein said averaging means further includes:

charge storage means coupled the received signal;

current limiting means interposed between the received signal and said charge storage means; whereby said current limiting means and said charge storage means produce the average magnitude by time averaging the received signal; and wherein said control means comprises a switching means interposed between the received signal and said charge storage means, wherein said determining means is enabled when said switching means couples said charge storage means to the received signal.

17. The apparatus of claim 16 wherein said control means couples said charge storage means to the received signal substantially around the center of each symbol.

* * * * *